United States Patent [19]

Hirao et al.

[11] Patent Number: 4,702,123
[45] Date of Patent: Oct. 27, 1987

[54] APPARATUS FOR DRIVING ROD FOR ROTATION

[75] Inventors: Kouji Hirao, Chiryu; Kazutaka Kuwana, Toyota; Ken Asami, Nagoya, all of Japan

[73] Assignees: Aisin Seiki Kabushikikaisha; Toyota Jidosha Kabushikikaisha, both of Aichi, Japan

[21] Appl. No.: 732,209

[22] Filed: May 9, 1985

[30] Foreign Application Priority Data

May 9, 1984 [JP] Japan .............................. 59-67283[U]
Apr. 19, 1985 [JP] Japan .............................. 60-58385[U]

[51] Int. Cl.$^4$ .................... F16D 71/04; F16F 9/18; F16F 9/34
[52] U.S. Cl. ...................................... 74/526; 74/818; 188/299; 188/319; 192/142 R; 192/149; 251/129.12
[58] Field of Search ................ 74/10.2, 526, 818; 188/285, 299, 319; 192/142 R, 142 A, 148, 149; 251/129.12

[56] References Cited

U.S. PATENT DOCUMENTS

| | | | |
|---|---|---|---|
| 2,477,589 | 8/1949 | DuShane | 74/526 |
| 2,627,405 | 2/1953 | Hlatko et al. | 188/285 |
| 2,912,866 | 11/1959 | Noyes, Jr. | 74/10.2 X |
| 3,015,793 | 1/1962 | Fraser et al. | 74/10.2 X |
| 3,063,518 | 11/1962 | Stark | 188/319 X |
| 3,717,231 | 2/1973 | Kaufeldt | 192/149 X |
| 4,444,072 | 4/1984 | Grimes et al. | 74/526 X |
| 4,463,839 | 8/1984 | Ashiba | 188/319 X |

Primary Examiner—Allan D. Herrmann
Attorney, Agent, or Firm—Sughrue, Mion, Zinn, Macpeak & Seas

[57] ABSTRACT

A rod actuator which includes a d.c. motor, a reduction gearing, a solenoid assembly which is used to define an intermediate stop position, and rotation stops. The angular extent through which an output shaft of the reduction gearing is rotatable is limited by a pair of limit stops. The solenoid assembly includes a plunger which is located intermediate the limit stops. A rotational stop is rotatably mounted on the output shaft and has a projection which is adapted to abut against the plunger to cease the motion of the rotational stop. The rotational stop is mounted on the output shaft so as to be rotatable relative thereto through a small angle by a lost motion, but is driven for integral rotation with the output shaft when such angle is exceeded. A lost motion connector is used so the angles of rotation where the rotation of the output shaft is stopped by the plunger during its clockwise and counter-clockwise rotations will be substantially equal. The actuator may be used in a shock absorber mounted on a vehicle to establish three levels, "high", "medium" and "low", of attenuation exhibited by the shock absorber.

18 Claims, 19 Drawing Figures

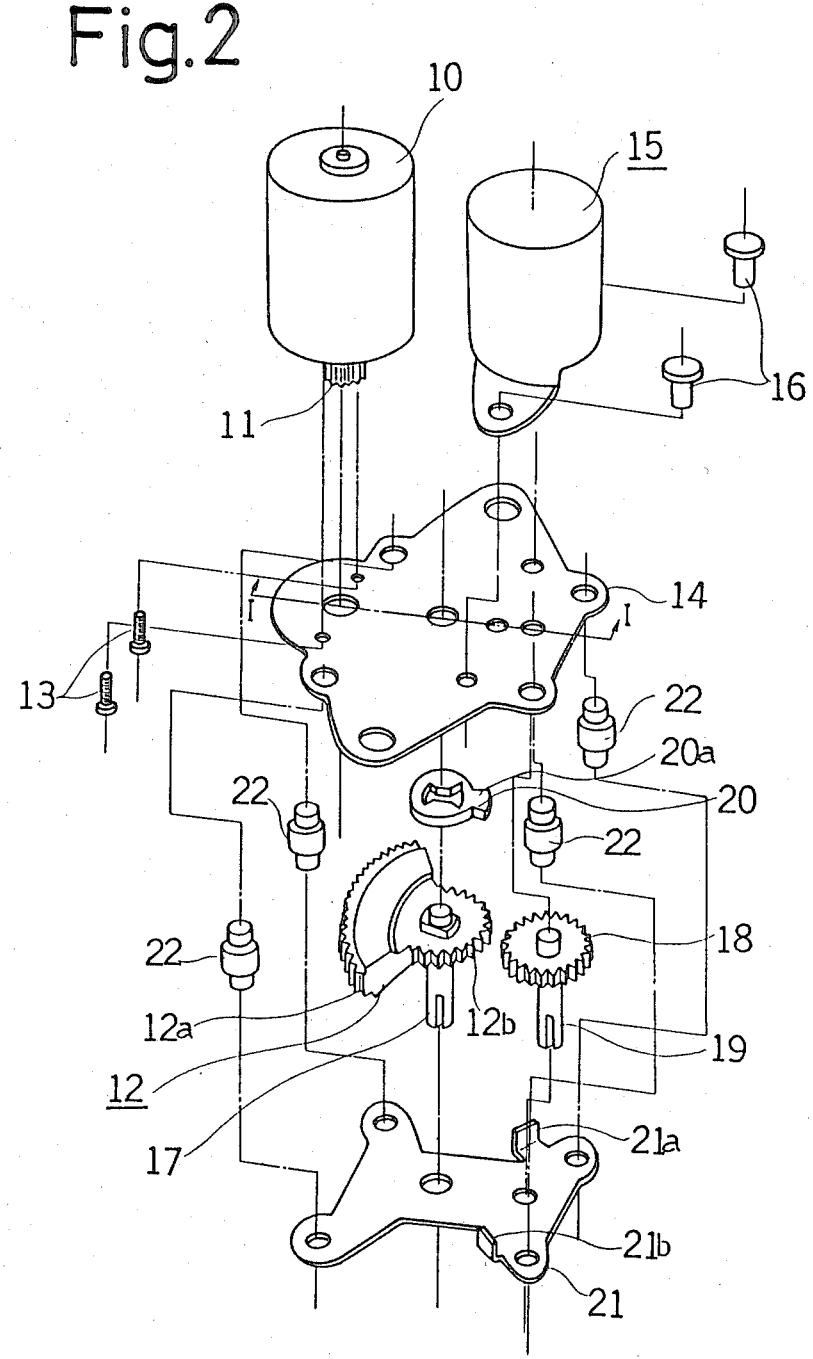

APPARATUS FOR DRIVING ROD FOR ROTATION

BACKGROUND OF THE INVENTION

The invention relates to an apparatus for driving rod for rotation in which a rod is driven to rotate through a given angular extent and its rotation is stopped at a given angle or angles of rotation, and in particular, although not limited thereto, to a rod actuator which drives an oil pressure controlling rod used in a shock absorber of a vehicle suspension to a given angle of rotation In one form, a shock absorber of a vehicle suspension generally comprises a cylinder containing a quantity of oil and a piston which divides the internal volume of the cylinder into two parts. The cylinder is connected to an axle while the piston is connected to a car body through a hollow piston rod. As mentioned, the piston divides the internal volume of the cylinder into two portions which communicate with each other through a channel. An oil pressure controlling rod extends through the piston rod into the channel. A rotary valve which regulates the flow area of the channel is incorporated into the piston, and the rod is secured to the rotary valve. When the rod is rotated in one direction, the rotary valve rotates in the same direction to increase the flow area of the channel to reduce the resistance presented to a flow of oil from one to the other of the divided portions within the cylinder or a flow in the opposite direction, thus facilitating a movement of the piston. In other words, the vertical oscillation of the piston and hence of the car body is reduced as compared with the vertical oscillation of the cylinder or the axle, increasing the load applied to a suspension spring while reducing the attenuation exerted by the shock absorber. Conversely, when the controlling rod is rotated in the opposite direction, the flow area of the channel is reduced, providing an added resistance to the movement of the piston. In other words, the vertical oscillation of the piston increases as compared with the vertical oscillation of the cylinder, decreasing the load applied to the suspension spring and causing the shock absorber to exhibit an increased magnitude of attenuation.

An actuator is coupled to the controlling rod in order to establish a given angle of rotation of the controlling rod or the flow area of the channel. Such actuator comprises an electric motor, a reduction gearing which provides a speed reduction to the rotation of the motor before it is transmitted to the controlling rod, and a plurality of switches or a potentiometer which detects an angle of rotation of the controlling rod. A shock absorber control system includes means for providing a command which establishes the attenuation to be exerted by the shock absorber or an angle of rotation of the controlling rod, and a motor control circuit which compares the command against a signal from the switches or the potentiometer to drive the controlling rod to a desired angle of rotation.

In another form, the shock absorber is additionally provided with an air chamber which is subject to pressures produced by an oscillation of the axle, and an auxiliary air chamber which communicates with the air chamber, a rotary valve being mounted in a region which provides a communication between the both chambers. An air pressure controlling rod is connected to the rotary valve. In a shock absorber of this type, the oil pressure controlling rod and the air pressure controlling rod are coupled to the rotary shaft of the single electric motor through a set of reduction gearings. Accordingly, there is a one-to-one correspondence between the angle of rotation of the oil pressure controlling rod and the angle of rotation of the air pressure controlling rod.

In a typical shock absorber of the prior art, the attenuation exerted is established at two levels, high and low, or at three levels of high, medium and low. Where the attenuation is established at two levels, the reduction gearing, for example, is provided with stops which permit the oil pressure controlling rod to rotate within a given angular range from a high to a low end or conversely from a low to a high end while preventing the rod to rotate beyond such angular extent. Representing a time period by T during which the motor is energized to rotate the oil pressure controlling rod through the permitted angular range or through a slightly extended range, the high level of attenuation can be established by energizing the motor for an interval T in the forward direction while the low level of attenuation can be established by energizing the motor for the same interval T in the reverse direction, thus dispensing with the switches or the potentiometer which is required in detecting the angular position. In addition, the hardware of the motor control circuit can be simplified. Where the motor drive is controlled by an electronic equipment such as a microprocessor, the control logic can be simplified. If the motor is energized for the interval T in a direction to exceed either limit position in response to a command which requires a high (or low) level of attenuation when the oil pressure controlling rod is at its high (or low) limit position, the motor will be energized without any rotational movement or will be overloaded since the reduction gearing is constrained by the stop, but any damage to the motor does not occur since the interval T is relatively short in duration. In other words, both the motor and the motor drive are constructed so as to be fully capable of withstanding the energization for the interval T without accompanying any rotation. It is also possible to design a control logic which prevents such energization without accompanying rotation from occurring in a motor control.

In a shock absorber which is designed to establish three levels, namely, high, medium and low, of attenuation, an arrangement is made such that a rotary plate, for example, is secured to the oil pressure controlling and rod and is formed with a single aperture which is located so as to correspond to the "medium level" of attenuation. The actuator also includes a solenoid assembly having a plunger which is located opposite to the aperture in the rotary plate whenever the oil pressure controlling rod assumes a position corresponding to the "medium level" of attenuation. When the oil pressure controlling rod is driven to the "medium" position where the solenoid is off and the plunger is urged by an associated spring to move into the aperture formed in the rotary plate from either position corresponding to the "high level" or "low level" of attenuation where the solenoid is off and the plunger is urged by a spring to abut against the surface of the rotary plate, the solenoid assembly is left deenergized while the motor is energized in either forward or reverse direction for substantially an interval of T/2. When the aperture in the rotary plate has rotated to a position directly below the plunger or when the oil pressure controlling rod has rotated to its "medium" position, the plunger is driven into the aperture in the rotary plate under the resilience of the spring. Conversely, when the oil pressure controlling rod is driven from a position corresponding to the "medium" level of attenuation to either position corresponding to the "high" or "low" level of attenuation, the solenoid assembly is energized to withdraw the plunger from the aperture in the rotary plate against the resilience of the spring, and the motor is energized in either reverse or forward direction for an interval substantially equal to T/2. The solenoid assembly is deenergized after the plunger has been withdrawn from the aperture.

Any of such shock absorbers which are designed to establish two or three levels of attenuation may be provided with a position sensor such as an angular position detecting switch assembly or a potentiometer. In such instance, the energization of the motor in forward or reverse direction or deenergization thereof is controlled on the basis of a status signal from the position sensor. The on/off control of the motor alone is insufficient to achieve an accurate positioning of the oil pressure controlling rod due to the inertia of the motor and its associated mechanism, but the combination of the stops which determine the "high" and the "low" level of attenuation, the rotary disc which determines the "medium" position and its associated solenoid assembly permits an accurate positioning to be achieved. In this manner, the energization of the motor without accompanying its rotation is substantially eliminated.

Referring back to the shock absorber which is designed to establish three levels of attenuation, the free end of the plunger of the solenoid assembly is urged against the rotary plate, which is used to establish a position corresponding to the "medium" level of attenuation, under the resilience of the coiled compression spring, as mentioned previously. The plunger must be advanced into the aperture smoothly when the rotary plate has rotated to place its aperture directly below the plunger. This requires that the aperture has a diameter which is greater than the diameter of the plunger. A difference between the diameters represents a play, which represents an error in determining the position corresponding to the "medium" level of attenuation. It will be seen that it is desired to provide as small a difference as possible between the diameters. However, a small difference in the diameters results in difficulty in causing the plunger to advance into the aperture, and any incomplete advancement of the plunger into the aperture results in a localized deformation or abration of the edge of the aperture and/or the free end of the plunger. Such deformation aggravates the advancement of the plunger into the aperture and also increases the degree of deformation to a greater degree. It is thus seen that the aperture in the rotary plate must be substantially oversized than the plunger, even though this results in an increased magnitude of error in the position which is achieved corresponding to the "medium" level of attenuation. Thus it will be seen that a mechanism for determining the position corresponding to the "medium" level of attenuation which comprises a combination of the rotary plate and the solenoid assembly involves a difficulty that the positioning accuracy and the positioning stability are two conflicting factors.

SUMMARY OF THE INVENTION

It is an object of the invention to provide an apparatus for driving a rod such as an oil pressure controlling rod used in a shock absorber which is designed to establish three levels, high, medium and low, of attenuation, for example, to rotate it to a given angle of rotation, in which the positioning stability is enhanced while increasing the positioning accuracy achieved with a positioning stop mechanism.

The above object is achieved in accordance with the invention in an apparatus for driving a rod for rotation comprising a reduction gearing including an output shaft which drives a rod such as an oil pressure controlling rod for rotation, an electric motor for driving an input shaft of the reduction gearing for rotation, a rotary plate coupled to the output shaft, and a solenoid assembly for constraining the rotary plate to stop at a given angle of rotation. In accordance with the invention, the rotary plate is provided with a projection which extends from its peripheral surface where the plunger of the solenoid assembly cannot abut it to a point where it may be abutted by the plunger, thus providing a rotational stop. With this arrangement, the free end of the plunger does not abut against the rotational stop. The plunger is retracted upward or advanced downward to its constraining position in accordance with the energization and the deenergization of the solenoid assembly while its position is maintained outside the peripheral surface of the rotary plate. When the rotary stop is driven for rotation when the plunger is located at its constraining position, a side of the projection on the rotary stop bears against the side of the plunger, whereby the rotary stop is prevented from rotating by the plunger. When the rotary stop is to be allowed to rotate, the solenoid assembly is energized to retract the plunger from its constraining position. When the plunger is retracted, no part of the rotary stop bears against the plunger.

Other objects and features of the invention will become apparent from the following description of embodiments with reference to the drawings.

BRIEF DESCRIPTION OF THE DRAWINGS

FIG. 2 is an exploded perspective view of the actuator shown in FIG. 1;

DESCRIPTION OF PREFERRED EMBODIMENTS

Figure 1:
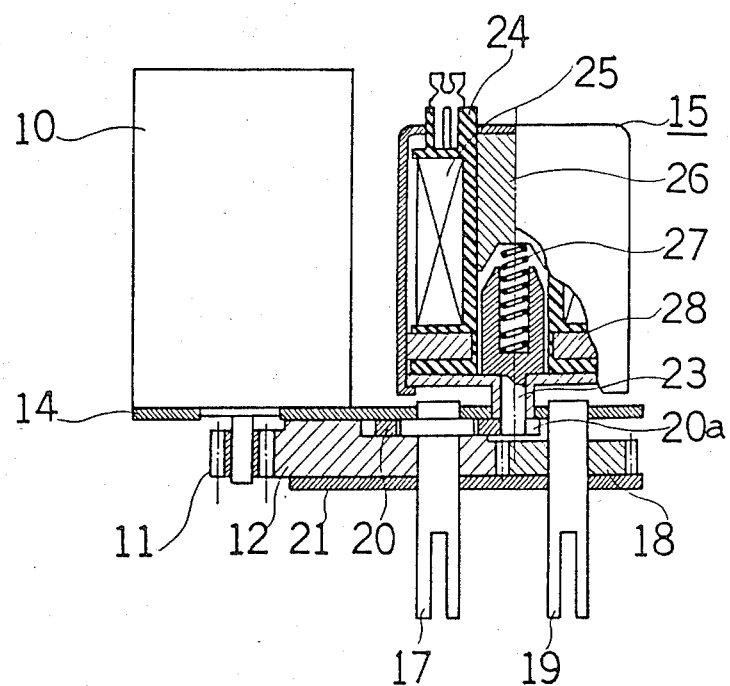
FIG. 1 is a partially broken away front view of a first embodiment of the invention which may be used as an actuator for driving an oil pressure controlling rod and an air pressure controlling rod of a shock absorber for rotation, which shock absorber is designed to establish three levels, high, medium and low, of attenuation.

Referring to FIG. 1 and FIG. 2 which shows an exploded view, illustrating a first embodiment of the invention, there is shown a d.c. reversible motor 10 having a rotary shaft on which a pinion 11 is fixedly mounted, the pinion 11 meshing with a larger diameter gear portion 12a of a sector gear 12. It will be seen that the motor 10 is threadably secured to a first baseplate 14 by means of mounting screws 13. A solenoid assembly 15 is secured to the baseplate 14 by staking fasteners 16. The sector gear 12 is fixedly mounted on a first output shaft 17 which is coupled to an oil pressure controlling rod which serves controlling the attenuation exerted by a shock absorber to one of three levels. The sector gear 12 also includes a reduced diameter gear portion 12b which meshes with a reduction gear 18 that is in turn fixedly mounted on a second output shaft 19 coupled to an air pressure controlling rod which causes the spring rate of the shock absorber to be changed.

An intermediate stop member 20 having a single projection 20a extending from its peripheral surface is a loose fit on the first output shaft with a given play therebetween. The sector gear 12, the reduction gear 18 and the intermediate stop member 20 are interposed between the first baseplate 14 and a second baseplate 21 which is provided with a pair of limit stops 21a, 21b. The spacing between the first and the second baseplate is determined by a spacer 22, which is staked to secure the first and the second baseplate 14, 21 in an integral manner.

As a result of the described arrangement, the rotation of the motor 10 is transmitted to the first and the second output shaft 17, 19. Specifically, the motor 10 drives the sector gear 12 fixedly mounted on the first output shaft 17 for rotation through the pinion 11 which is fixedly mounted on the motor shaft. This causes the first output shaft 17 to rotate, and the sector gear 12 causes the reduction gear and hence the second output shaft 19 on which it is fixedly mounted to rotate.

The solenoid assembly 15 includes an electrical coil which when energized induces a magnetic flux in a magnetic path defined by a housing, a yoke 28 and a core 26, whereby a plunger 23 is attracted by the core 26 against the resilience of a compression spring 27 until it abuts against the core 26. In other words, the plunger 23 is retracted from a path of movement of the projection 20a on the stop member 20, allowing a free rotation of the stop member 20.

Conversely, when the solenoid assembly 15 is deenergized, the plunger 13 is urged by the coiled compression spring 17 to move downward, thus moving into the path of movement of the projection 20a on the stop member 20, as indicated in FIG. 1. Under this condition, when the sector gear 12 is driven for rotation, the projection 20a on the stop member 20 bears against the plunger 23 at a selected angle of rotation, whereby the sector gear 12 ceases to move.

Figure 3A:
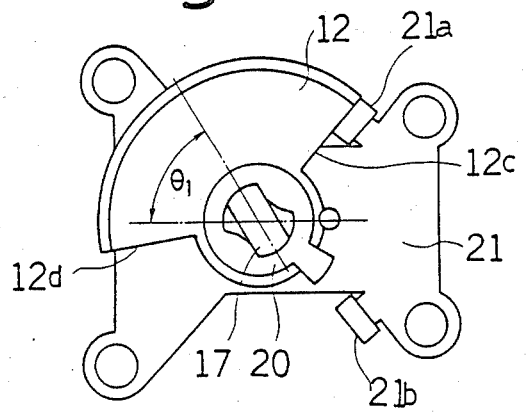
FIGS. 3a, 3b and 3c and FIGS. 4a, 4b and 4c are plan views of a sector gear shown in FIG. 1 at different angles of rotation.
Figure 3B:
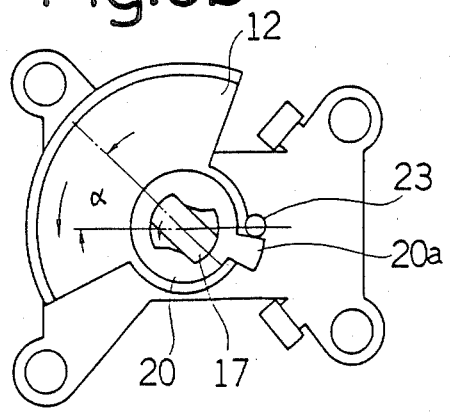
Figure 3C:
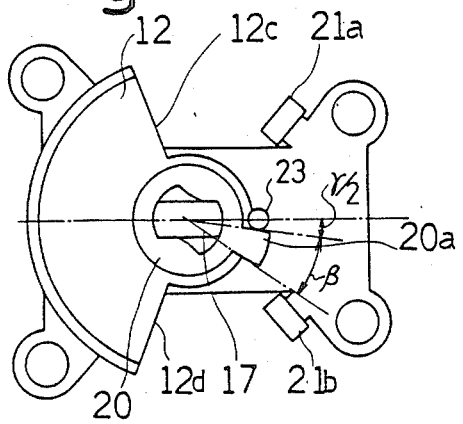
Figure 4A:
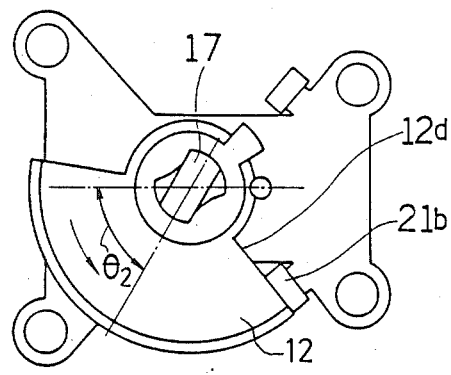
Figure 4B:
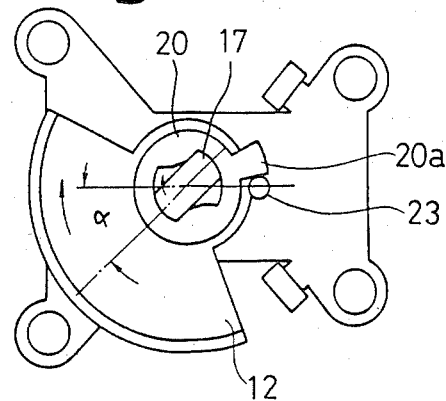
Figure 4C:
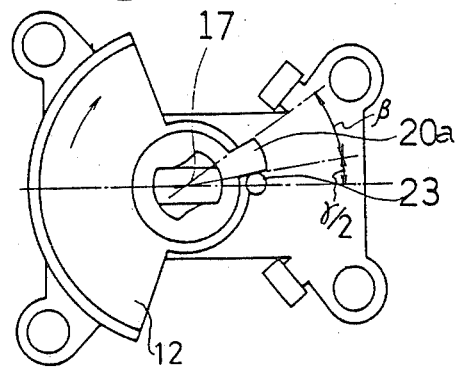

The positional relationship among the stops 21a and 21b on the second baseplate 21, the sector gear 12, the stop member 20 and the plunger 23 will now be described with reference to FIGS. 3a to 3c and FIGS. 4a to 4c. It will be seen that the stops 21a, 21b, which are formed by raised pieces from the second baseplate 21 serve stopping the clockwise and the counter-clockwise rotation, respectively, of the sector gear 12. FIG. 3a shows the clockwise limit position of the sector gear 12 where it abuts against the stop 21a to cease its motion during its clockwise rotation, FIG. 4a shows the counter-clockwise limit position of the sector gear 12 where it abuts against the stop 21b to cease its motion during its counter-clockwise rotation. When the gear 12 is driven to rotate counter-clockwise from its clockwise limit position (FIG. 3a) while maintaining the solenoid assembly 15 deenergized, the rotation of the projection 20a is initially stopped by abutment against the plunger 23 which then assumes its down position (see FIG. 3b). However, the stop member 20 is mounted on the first output shaft 17 with an angular play α, and hence the sector gear 12, the first output shaft 17 and the second output shaft 19 continue to rotate counter-clockwise, and their motion is stopped and these members are constrained after rotating through an angle α counter-clockwise (see FIG. 3c). When the solenoid assembly 15 is energized with the sector gear 12 remaining stationary as shown in FIG. 3c, and the sector gear 12 is then further driven to rotate counter-clockwise, the projection 20a moves below the plunger 23, and the sector gear 12 stops its motion by abutment against the stop 21b subsequently (FIG. 4a). When the solenoid assembly 15 is deenergized and the sector gear 12 is driven for clockwise rotation from its counterclockwise limit position (FIG. 4a), the projection 20a ceases its motion by abutment against the plunger 23 (FIG. 4b). However, as mentioned previously, the stop member 20 is engaged with the first output shaft 17 with an angular play α, and hence the sector gear 12, the first output shaft 17 and the second output shaft 19 continue to rotate clockwise, and are constrained after having further rotated through the angle α clockwise (FIG. 4c). Under the condition that the sector gear 12 remains stationary at a position shown in FIG. 4c, if the solenoid assembly 15 is energized and then the sector gear 12 is driven for further clockwise rotation, the projection 20a moves below the plunger 23, and subsequently the sector gear 12 stops its motion by abutment against the stop 21a (FIG. 3a).

In this embodiment, in order to assure that the sector gear 12 is stopped by the plunger 23 at an angle of rotation when it is driven from its clockwise limit position (FIG. 3a) to its intermediate position (FIG. 3c) which is the same as the angle of rotation where it is stopped when it is driven from its counter-clockwise limit position (FIG. 4a) to its intermediate position (FIG. 4c), the width of the projection 20a, the diameter of the plunger 23 and the angular play of the stop 20 with respect to the first output shaft 17 is chosen to satisfy the relationship that $\alpha = \beta + \gamma/2$ where α represents the angular play of the stop member 20 with respect to the first output shaft 17, as mentioned previously, β an angle determined by the width of the projection 20a, as measured between a point of abutment between the projection 20a and the plunger 23 under the condition shown in FIG. 3c and a point of abutment between the projection 20a and the plunger 23 under the condition shown in FIG. 4c, and γ an angle determined by the diameter of the plunger 23, as measured between a point of abutment between the plunger 23 and the projection 20a under the condition shown in FIG. 3c and a point of abutment between the plunger 23 and the projection 20a under the condition shown in FIG. 4c.

As referenced to the intermediate position of the sector gear 12 (FIGS. 3c and 4c), an angle through which the sector gear 12 rotates from its intermediate position (FIG. 4c) to its clockwise limit position (FIG. 3a) is denoted by $\theta_1$ and an angle through which the sector gear 12 rotates from its intermediate position (FIG. 3c) to its counter-clockwise limit position (FIG. 4a) is denoted by $\theta_2$. Using these parameters, the sector gear 12 is rotatable through an angle extent represented by $(\theta_1 + \theta_2)$. Accordingly, three angular positions of the sector gear 12 and hence of the first and the second output shaft 17, 19 can be chosen within such angular range, namely, clockwise limit position, intermediate position and counter-clockwise limit position. These three positions can be assigned to the high, medium and low levels of attenuation exerted by the shock absorber. The values of $\theta_1$ and $\theta_2$ are determined by the location of the stops 21a and 21b, and hence can be freely chosen in design.

In the described embodiment, the stop member 20 is engaged with the first output shaft 17, but it may be similarly engaged with the second output shaft 19, the output shaft of the motor 10 or the shaft associated with the pinion 11. In addition, rather than providing a single projection 20a as in the described embodiment, a plurality of such projections may be formed on the stop member 20. In such instance, the location of these projections may be chosen between the clockwise and the counterclockwise limit position.

Figure 5:
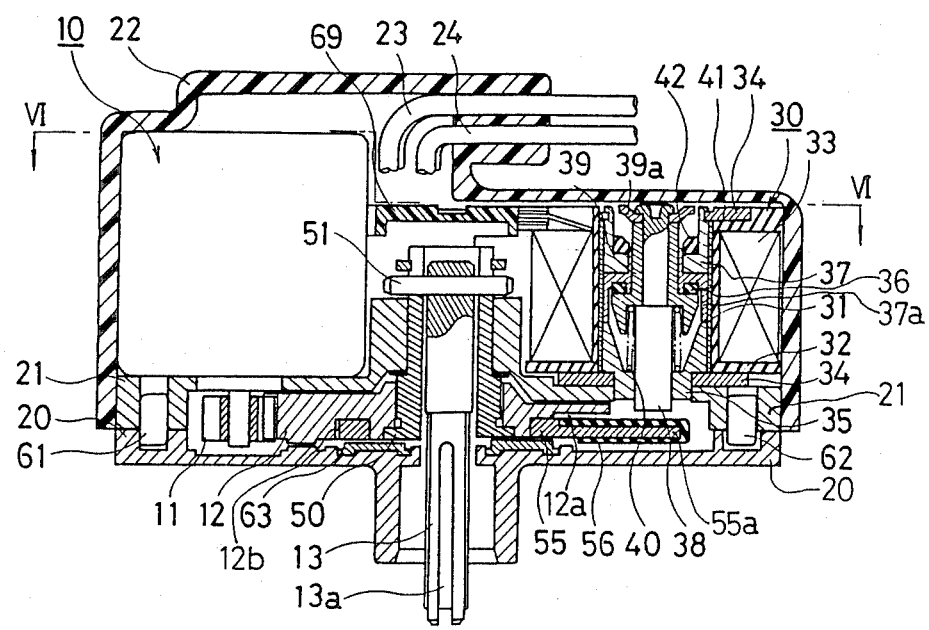
FIG. 5 is a longitudinal section of a second embodiment of the invention which may be used as an actuator for driving for rotation an oil pressure controlling rod of a shock absorber which is designed to establish three levels, high, medium and low, of attenuation.
Figure 6:
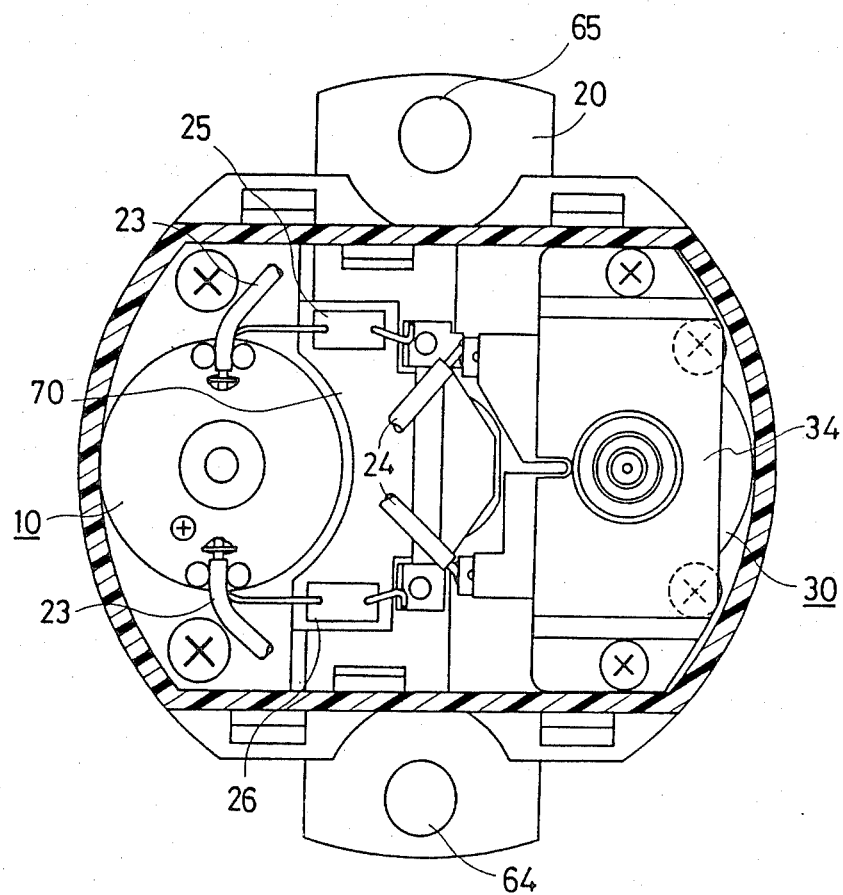
FIG. 6 is a cross section taken along the line VI—VI shown in FIG. 5.
Figure 7:
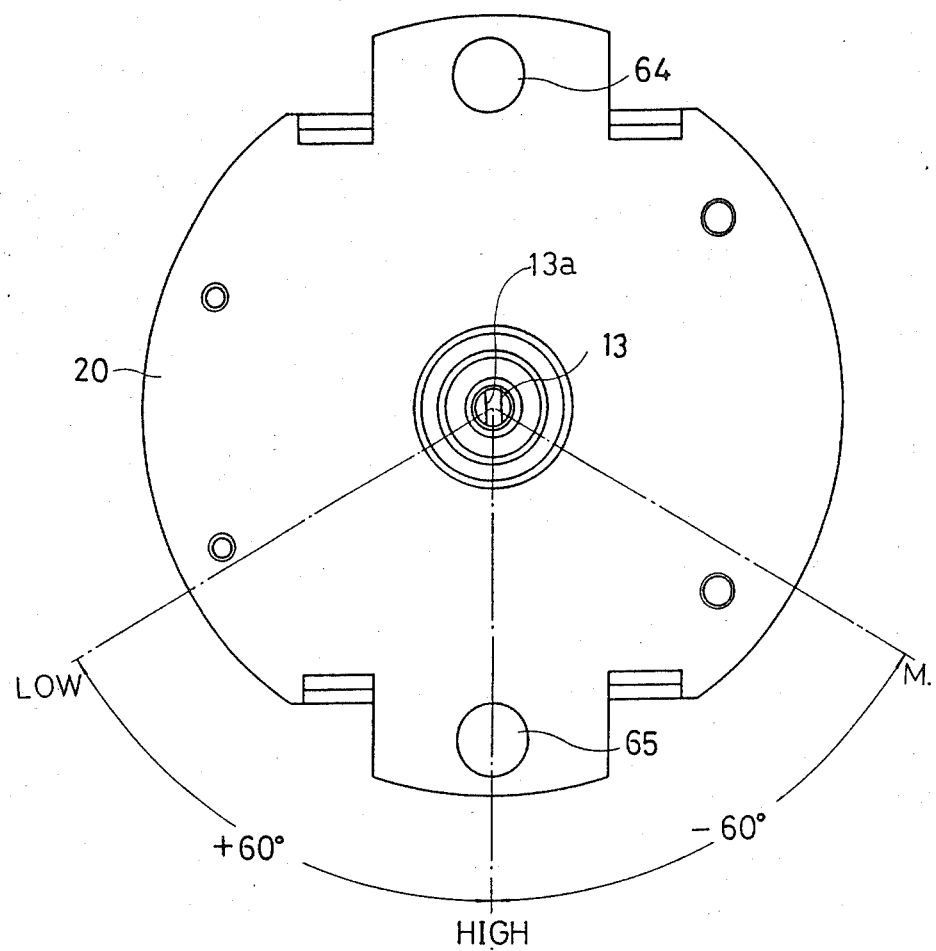
FIG. 7 is a bottom view of the actuator shown in FIG. 5.

FIGS. 5, 6 and 7 show a second embodiment of the invention. As before, a d.c. reversible motor 10 has a rotary shaft on which a pinion 11 is fixedly mounted and meshes with a main gear 12 which is fixedly mounted on a rotary shaft 50. An output shaft 13 is connected to the rotary shaft 50 by means of a spring pin 51. The d.c. motor 10 is mounted on a base 21 and is energized through lead wires 23. A pair of noise removing capacitors 25, 26 (see FIG. 6) are connected between each terminal of the motor 10 and the ground.

A solenoid assembly 30 is mounted also on the base 21. It comprises a coil 33 disposed on a bobbin 32 of a non-magnetic material which is passed over a sleeve 31 formed of a non-magnetic metal. When the coil 33 is energized through lead wires 44, a magnetic flux is induced in a path including a yoke 34, fixed core 37, plunger 39, fixed core 35 and returning to the yoke 34. Such flux causes the plunger 39 to be driven downward, as attracted by the core 35, against the resilience of a coiled compression spring 40. Secured to the plunger 39 are a stop ring 39a and a non-magnetic stop rod 38, and as the plunger 39 moves downward, the stop rod 38 moves into a path of rotation of a projection 55a formed on a stop plate 55. When the plunger 39 is driven downward through a given stroke, the stop ring 39a abuts against a rubber ring 42, thereby compressing it. When the rubber ring 42 is compressed to a degree by the stop ring 39a, the conical outer surface of the plunger 39 moves into contact with a funnel-shaped internal surface of the core 35. The rubber ring 42 serves as a cushion which prevents the effect of an impact. When the coil 33 is deenergized, the resilience of the spring 40 drives the plunger 39 upward, whereby the stop rod 38 is retracted upwardly and out of the path of rotation of the projection 55a. The plunger 39 comes to a stop after it has compressed a rubber ring 36 to a degree. The rubber ring 36 also serves as a cushion which avoids the effect of an impact. FIG. 5 illustrates the deenergized condition of the coil 33. The distance between the fixed cores 35 and 37 is determined by the length of a non-magnetic guide sleeve 37a. The yoke 34 clamps the fixed core 35, the guide sleeve 37a and the fixed core 37 together in an integral manner. The yoke 34 also clamps and supports the coil bobbin 32, but the presence of the fixed core 35, the guide sleeve 37a and the fixed core 37 prevents the bobbin 32 from being stressed excessively.

The rotary shaft 50 is rotably journalled in the base 21, and the main gear 12 is rigidly mounted on the rotary shaft 50 as by an insert molding. In its bottom region, the output shaft 13 is formed with split grooves 13a, in which a top end of an oil pressure controlling rod 75 of a shock absorber, shown in FIG. 10 and described later, is fitted, such top end being machined to a substantially rectangular configuration to provide an engaging end.

Figure 8A:
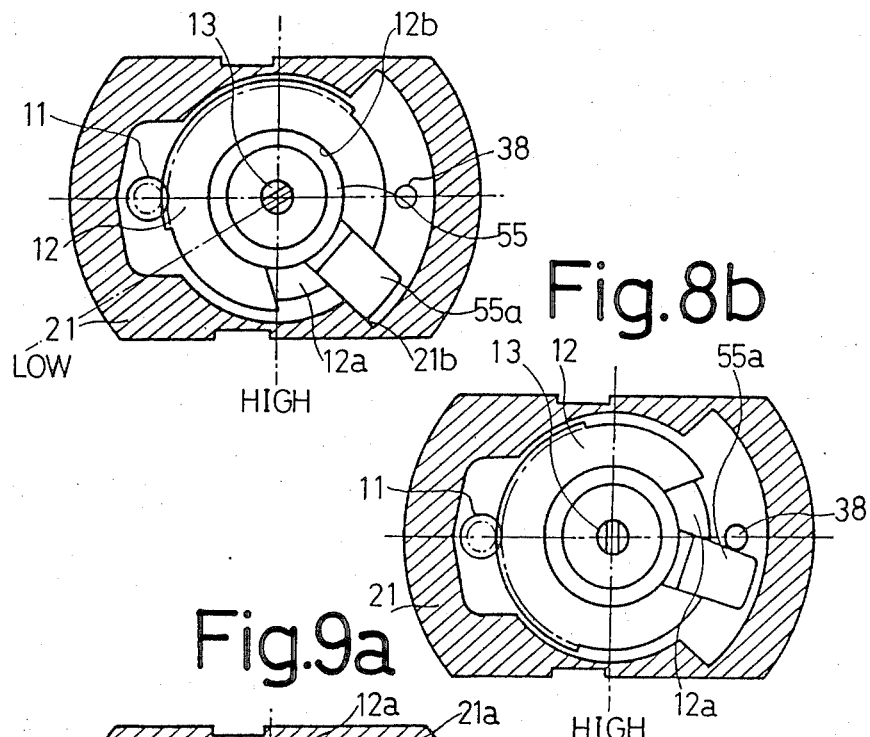
FIGS. 8a and 8b and FIGS. 9a and 9b are bottom views, to a reduced scale, of a main gear of the actuator shown in FIG. 5.
Figure 8B:
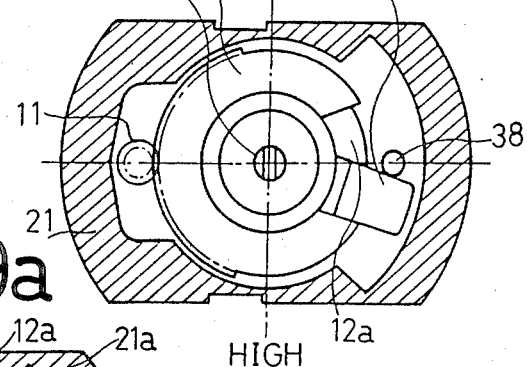
Figure 9A:
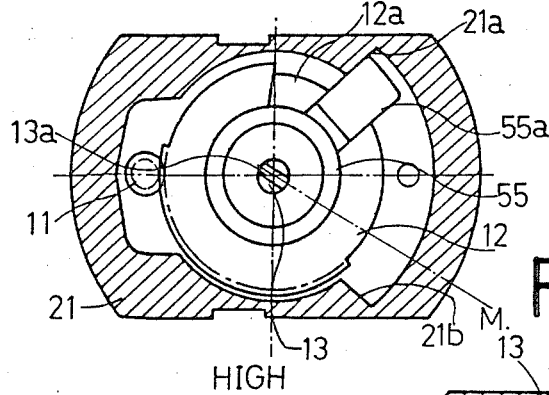
Figure 9B:
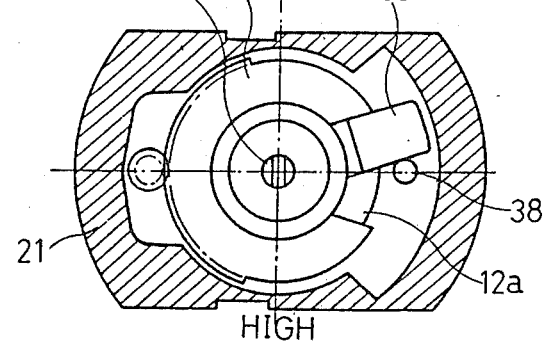

Formed in the lower surface of the main gear 12 is an annular groove 12b in which the stop plate 55 is rotatably received, and also a fan-shaped groove 12a having a relatively large area which continues from the groove 12b and in which the projection 55a on the stop plate 55 is situated. Such disposition will be readily apparent by reference to FIGS. 8a, 8b, 9a and 9b which are bottom views, to a reduced scale, of the main gear 12. Although the stop plate 55 is rotatably carried by the main gear 12, and hence is rotatable relative thereto, its rotation is limited to an angular extent through which the projection 55a on the stop plate 55 is rotatable within the fan-shaped groove 12a formed in the main gear 12. FIG. 8a shows a clockwise limit position of the main gear 12 which is reached when it rotates clockwise to drive the projection 55a with the upper end of the groove 12a formed therein until the projection 55a bears against a projecting wall 21b of the base 21. Under this condition, a further clockwise rotation of the projection 55a is blocked by the wall 21b, and hence the main gear 12 cannot rotate further clockwise. When the solenoid assembly 30 is energized at the clockwise limit position shown in FIG. 8a, to drive the stop rod 38 downward and then the main gear 12 is driven for counter-clockwise rotation, the stop plate 55 also rotates counter-clockwise, and initially the projection 55a ceases to move by abutment against the stop rod 38 while the main gear 12 continues its counter-clockwise rotation. When the lower end of the fan-shaped groove 12b in the main gear 12 bears against the projection 55a, a rubber cap 56 which coats the projection 55a is compressed to a degree between the projection 55a and the stop rod 38, whereby the stop plate 55 and the main gear 12 assume their positions illustrated in FIG. 8b where they are incapable of further rotation counter-clockwise. Such position represents an intermediate position during the counter-clockwise rotation (FIG. 8b). At the intermediate position shown in FIG. 8b, when the solenoid assembly 30 is deenergized to retract the stop rod 38 upwardly and hence out of the path of rotation of the projection 55a, and then the sector gear 12 is driven for counter-clockwise rotation, the projection 55a moves below the rod 38 and then abuts against the projecting wall 21a of the base 21, whereby a further counter-clockwise rotation of the stop plate 55 is blocked. Since the lower end of the fan-shaped groove 12a in the main gear 12 bears against the projection 55a, the counter-clockwise rotation of the main gear is also blocked. This represents the counter-clockwise limit position which is shown in FIG. 9a. When the solenoid assembly 30 is now energized to move the stop rod 38 into the path of rotation of the projection 55a and then the main gear 12 is driven for clockwise rotation from the counter-clockwise limit position shown in FIG. 9a, the projection 55a initially bears against the stop rod 38 to cease the movement of the stop plate 55, followed by the upper end of the fan-shaped groove 12b in the main gear 12 bearing against the projection 55a, thus compressing the rubber cap 56 coating the projecting 55a to a degree. The stop plate 55 and the main gear 12 assume their positions shown in FIG. 9b where they are incapable of further rotation in the clockwise direction. This position represents an intermediate position during the clockwise rotation, which is shown in FIG. 9b. When the solenoid assembly 30 is deenergized to retract the stop rod upwardly and out of the path of rotation of the projection 55a and the sector gear 12 is driven for clockwise rotation from the intermediate position shown in FIG. 9b, the projection 55a moves below the rod 38 and then bears against the projecting wall 21b of the base 21, whereby the clockwise rotation of the stop plate 55 is blocked. Since the upper end of the groove 12a bears against the projection 55a, the clockwise rotation of the main gear 12 is also blocked. This represents the clockwise limit position which is shown in FIG. 8a.

The angle through which the stop plate 55 can rotate relative to the main gear 12, or the angle through which the projection 55a is rotatable within the groove 12b may be represented by $\alpha$. As used in connection with the first embodiment shown in FIGS. 3c and 4c, an angle defined between a point of abutment of the projection 55a against the stop rod 38 in the position shown in FIG. 8b and a point of abutment of the projection 55a against the stop rod 38 in the position shown in FIG. 9b may be represented by $\alpha$, and an angle defined by a point of abutment of the stop rod 38 against the projection 55a in the position of FIG. 8b and a point of abutment of the stop rod 38 against the projection 55a in the position of FIG. 9b may be represented by $\gamma$. Using these parameters, if the width of the groove 12a, the width of the projection 55a inclusive of the thickness of the rubber cap 56 and/or the diameter of the stop rod 38 are chosen so that the relationship $\alpha = \beta + \gamma/2$ is satisfied, it will be seen that the intermediate position during the counter-clockwise rotation shown in FIG. 8b coincides with the intermediate position during the clockwise rotation shown in FIG. 9b. Such choice is made in the present embodiment.

At the intermediate positions shown in FIGS. 8b and 9b, the surface of the split groove 13a formed in the output shaft 13 is parallel to a second reference line which is orthogonal to a first reference line joining the center of the pinion 11 and the center of the stop rod 38. This position may be assigned to a position of an oil pressure controlling rod 75 which corresponds to the "high" level of attenuation exerted by a shock absorber (shown in FIG. 10). On the other hand, the clockwise limit position shown in FIG. 8a may be assigned to the "low" level of attenuation while the counter-clockwise limit position shown in FIG. 9a may be assigned to the "medium" level of attenuation. When these assignments are made, the "low" position assumes an angular position of $+60°$ and the "medium" position has an angular position of $-60°$, as referenced to the "high" position in the present embodiment. When assembling the actuator shown in FIG. 5 into a shock absorber shown in FIG. 10, an arrangement is made to permit the recognition of the angular position of the main gear 12 of the actuator, by providing the second reference line as a line which joins apertures 64, 65 which are formed on a common diameter in a bottom member 20 located below the base 21, as shown in FIG. 7. When the actuator (FIG. 5) is assembled into the shock absorber (FIG. 10), screws are passed through the apertures 64, 65 in the bottom member 20 and carried through the shock absorber and are threadably engaged with a support, not shown, which bears a car body.

Referring to FIG. 5, the bottom member 20 is secured to the base 21 by utilizing positioning pins 61, 62. A thrust bearing 63 is mounted centrally in the bottom member 20 in order to support the rotary shaft 50 and the main gear with a reduced sliding resistance.

Figure 10:
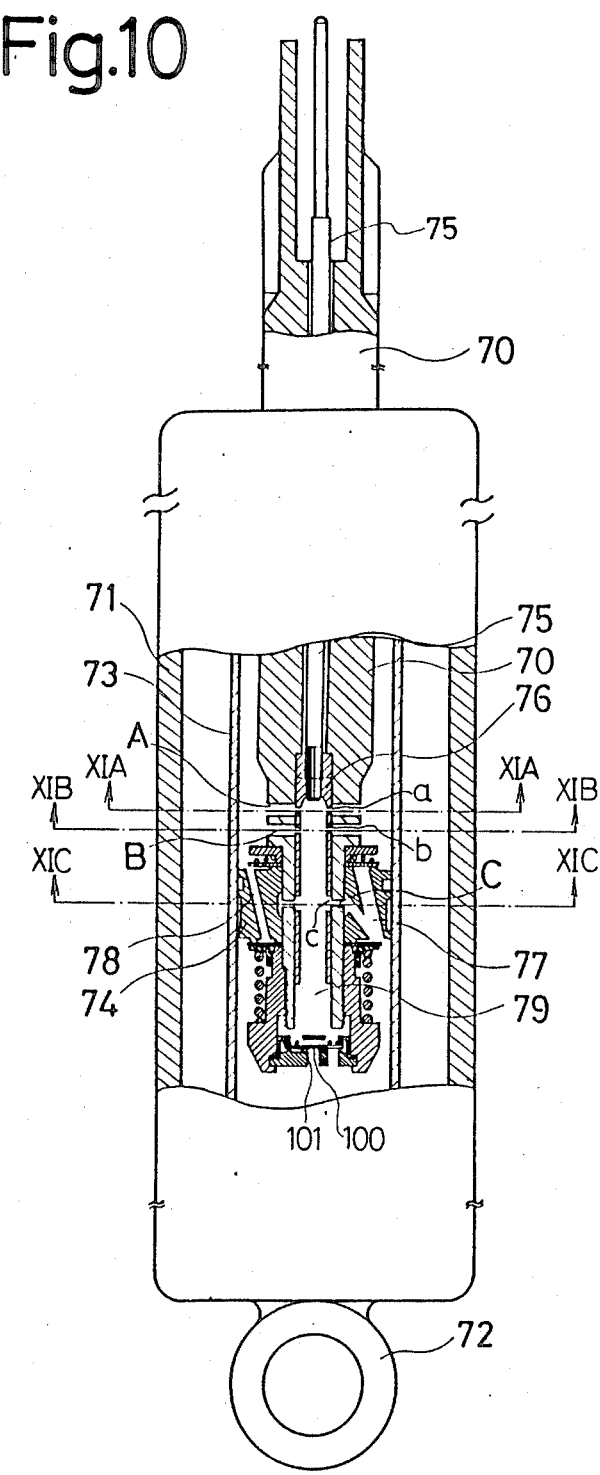
FIG. 10 is a front view, partly in section, and to a reduced scale, of a shock absorber in which the actuator shown in FIG. 5 is incorporated.

The output shaft 13 of the actuator shown in FIG. 5 is coupled to the oil pressure controlling rod 75 of the shock absorber shown in FIG. 10. It should be understood that the proportions of the actuator used in FIG. 5 are different from the proportions used to indicate the actuator in the shock absorber shown in FIG. 10. Thus, the shock absorber is shown to a reduced scale in FIG. 10.

Referring to FIG. 10, the shock absorber includes an outer shell 71, the lower end of which is provided with a lower knuckle joint 72 for mounting on an axle by means of a lower stay. An upper knuckle joint, not shown, is fixedly connected to the top of a piston rod 70, and this joint is mounted on a frame by means of an upper stay. A spring is interposed between the frame and the axle.

The outer shell 71 internally houses an inner cylinder 73, in the lower end of which is disposed a base valve assembly of a known form. A valve assembly 74 is disposed on the lower end of the piston rod 70. The oil pressure controlling rod 75 extends along the axis of the piston rod 70 and has its lower end secured to a rotary valve 76. The upper end of the rod 75 is machined to exhibit a substantially rectangular configuration, which is adapted to be inserted into the split grooves 13a formed in the output shaft 13 of the actuator shown in FIG. 5.

The valve assembly 74 includes a passage 77 of an increased diameter which allows an oil to pass therethrough from below to above the assembly 74 as the vehicle wheels bound, and another passage 78 of a reduced diameter which allows an oil to be passed from above to below the assembly 74 during a rebound process. The piston rod 70 includes a passage which bypasses the valve assembly 74, and orifices C, B and A which control the bypass passage at a plurality of stages including "high", "medium" and "low" levels. The rotary valve 76 secured to the controlling rod 75 is formed with orifices a, b and c which operate to open or close the orifices A, B and C, respectively. The "high" level of the bypass passage corresponds to the maximum attenuation exerted by the shock absorber of a suspension system. Similarly, the "low" level of the bypass passage corresponds to the minimum attenuation exerted by the shock absorber. Accordingly, the "medium" level of the bypass passage establishes an attenuation exerted by the shock absorber which is intermediate between the two levels mentioned above.

Figure 11A:
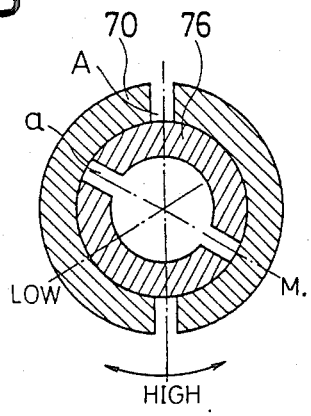
FIG. 11a is a cross section, to an enlarged scale, taken along the line XIA—XIA shown in FIG. 10.
Figure 11B:
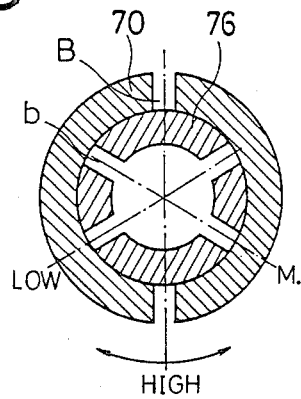
FIG. 11b is a cross section, to an enlarged scale, taken along the line XIB—XIB shown in FIG. 10.
Figure 11C:
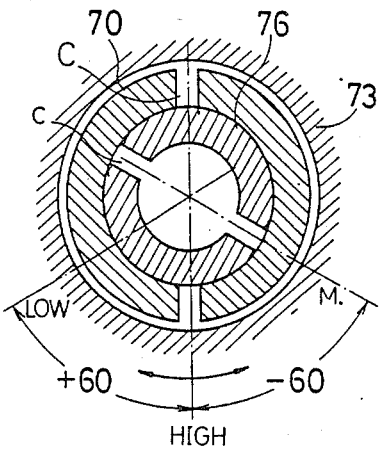
FIG. 11c is a cross section, to an enlarged scale, taken along the line XIC—XIC shown in FIG. 10.

FIGS. 11a, 11b and 11c are cross sections taken along the lines XIA—XIA, XIB—XIB and XIC—XIC shown in FIG. 10, respectively, and correspond to the "high" position of the rotary valve 76. At this "high" position, all of the orifices A, B and C in the piston 70 are closed by the rotary valve 76. When the rotary valve 76 is rotated 60° clockwise, the orifices A, B and C are aligned with the orifices a, b and c, respectively, of the rotary valve 76, this represents the "low" position. When the rotary valve 76 is rotated 60° counter-clockwise from the "high" position shown in FIGS. 11a to 11c, the orifice B in the piston rod 70 is aligned with the orifice b in the rotary valve 76, but both the orifices A and C are closed by the rotary valve 76.

As mentioned previously, FIG. 10 represents the "low" position and FIGS. 11a to 11c represent the "high" position. The output shaft 13 of the actuator is coupled to the oil pressure controlling rod 75 of the shock absorber when the output shaft of the actuator is established at its "high" position as shown and the oil pressure controlling rod 75 is established at its "high" position in the shock absorber of FIG. 10. Assuming that such coupling is achieved, the relationship between the angle of rotation of the output shaft 13 of the actuator shown in FIG. 5 and an oil flow within the shock absorber shown in FIG. 10 will now be described.

When the output shaft 13 of the actuator shown in FIG. 5 assumes its "high" position, the orifices A, B and C of the shock absorber are closed as indicated in FIGS. 11a to 11c. When vehicle wheels bound, the oil located below the valve assembly 74 flows upwardly thereof through the passage 77 having an increased diameter. During a rebound process, the oil located above the valve assembly 74 flows through the passage 78 having a reduced diameter to a point downward of the assembly. If the oil pressure below the assembly exceeds a given value during a bounding process, a valve member 100 moves upward, but since the orifices A and B are closed, there cannot be an oil flow through an internal space 79 within the piston rod 70 to a point upward of the valve assembly 74.

When the output shaft 13 of the actuator shown in FIG. 5 assumes its "medium" position, the orifice B is open, but the orifices A and C are closed in the shock absorber. When vehicle wheels bound, there occurs an upward oil flow through the passage 77, from below to above the assembly, and when the oil pressure increases beyond a given value, the valve member 100 moves upward, whereby the oil flows from below to the upside through a valve opening 101 and the orifice B. During a rebound process, the oil flows from up to down through the passage 78. The valve member 100 interrupts the oil flow which tends to flow downward through the orifice B and the internal space 79 from the opening 101.

When the output shaft 13 of the actuator shown in FIG. 5 assumes its "low" position, the orifices A, B and C are open in the shock absorber (see FIG. 10). As vehicle wheels bound, the oil flows from below to above the assembly through the passage 77, and also flows from below to above the assembly through the passage 77 and the orifices A and B. As the oil pressure increases beyond a given value, the valve member 100 moves upward to allow the oil to flow from below to above through the valve opening 101 and the orifices A and B. During a rebound process, the oil flows from up to down through the passage 78, and also flows from up to down through the orifices A and B and then through the orifice C and through the passage 77.

In the second embodiment mentioned above in connection with FIG. 5, the connection between the main gear 12 and the output shaft 13 takes place through the rotary shaft 50. However, it should be understood that the interposition of the rotary shaft 50 is not essential.

By way of example, the main gear 12 and the rotary shaft 50 may be formed integrally or the rotary shaft 50 may be used as an output shaft. As a further alternative, the output shaft 13 may be replaced by the controlling rod 75.

Having described preferred embodiments of the invention, modifications will be evident to those skilled in the art without departing from the scope of the invention as defined in the apended claims.

What is claimed is:

1. An apparatus for driving rod for rotation comprising:
    a support member;
    a d.c. motor having a rotary shaft carried by the support member;
    a solenoid assembly carried by the support member and including a fixed core member, a plunger member, a spring member for urging the plunger member and an electrical coil which surrounds the fixed core member, the arrangement being such that the plunger member is driven to a first position against the resilience of the spring member when the electrical coil is energized and the plunger member is located at a second position which is spaced from the first position when the electrical coil is deenergized;
    output shaft means rotatably mounted in the support member;
    reduction gearing means interposed between the rotary shaft of the motor as an input shaft thereof and the output shaft means as an output rotating shaft thereof for providing a speed reduction of rotation of the d.c. motor before it is transmitted to the output shaft means;
    a rotatable member rotatably mounted on one of the rotating shafts of the reduction gearing and including projection means which abuts the plunger member in said first position and which does not abut against the plunger member in the said second position;
    lost motion coupling means for coupling the rotatable member to the rotating shaft in a manner to permit a rotation of the rotatable member within a given small angel while preventing a rotation of the rotatable member beyond the given angle;
    a first stop member for preventing a rotation of the rotating shaft in a first direction at an angle of rotation where the projection means has rotated through the given angle beyond the position of the plunger member, and a second stop member for preventing a rotation of the rotating shaft in a second direction which is opposite from the first direction at an angle of rotation where the projection means has rotated through the given angle beyond the position of the plunger;
    wherein said small angle is represented by $\alpha$, an angle subtended with respect to the center of rotation of the projection means by a first point on the projection means where it abuts against the plunger member in its first position which is assumed as a result of its rotation in the first direction and a second point on the projection means where it abuts against the plunger member at its first position which is assumed as a result of rotation in the second direction by $\beta$, and an angle subtended by a pair of points on the plunger member which correspond to the first and the second point with respect to the center of rotation of the projection means by $\gamma$, $\alpha$ is substantially equal to $(\beta+\gamma/2)$; and wherein said reduction gearing means comprises a small gear fixedly mounted on the rotary shaft of the d.c. motor and a larger gear fixedly mounted on the output shaft means and meshing with the small gear, the larger gear being formed in its lower surface with an annular groove in which the rotatable member is rotatably mounted, and in which the support member comprises a base located above the small and the larger gear and carrying the d.c. motor and the solenoid assembly thereon and also rotatably carrying the output shaft means and having an opening through which the plunger member extends, the lost motion coupling means comprising a fan-shaped groove formed in the larger gear so as to be continuous with the annular groove, the projection means on the rotatable member engaging the fan-shaped groove which permits the projection means to rotate therein through the given small angle.

2. An apparatus according to claim 1 in which the first and the second stop member comprise upright walls of the base against which the projection means abuts.

3. An apparatus according to claim 2 in which the projection means carries an elastic member on its surface.

4. An apparatus according to claim 2 in which the output shaft means comprises a hollow rotary shaft on which the larger gear is fixedly mounted, an output shaft which is fitted inside the hollow rotary shaft and a spring pin for connecting the output shaft to the hollow rotary shaft.

5. An apparatus for driving rod for rotation comprising:

a support member;

a d.c. motor having a rotary shaft carried by the support member; including a fixed core member, a plunger member, a spring member for urging the plunger member and an electrical coil which surrounds the fixed core member, the arrangement being such that the plunger member is driven to a first position against the resilience of the spring member when the electrical coil is energized and the plunger member is located at a second position which is spaced from the first position when the electrical coil is deenergized;

output shaft means rotatably mounted in the support member;

reduction gearing means including a gear fixedly mounted on the rotary shaft of the d.c. motor and another gear fixedly mounted on the output shaft means, the reduction gearing being interposed between the rotary shaft of the motor as an input shaft thereof and the output shaft means as an output rotating shaft thereof for providing a speed reduction of rotation of the d.c. motor before it is transmitted to the output shaft means;

a rotatable member rotatably mounted on one of the rotating shafts of the reduction gearing and including projection means which does not abut the plunger member in one of its first and second positions and which abuts against the plunger member in the other of its first and second positions, said rotatable member with projection means being rotatable in a plane perpendicular to the direction of movement of said plunger;

lost motion coupling means for coupling the rotatable member to the rotating shaft in a manner to permit a rotation of the rotatable member relative to said shaft through a given small angle $\alpha$ while preventing a rotation of the rotatable member subsequent to abutment of the projection means with the plunger member and the rotating shaft beyond the given angle;

a first stop member for preventing a rotation of the rotating shaft in a first direction at an angle of rotation where the projection means has rotated through the given angle beyond the position of the plunger member, and a second stop member for preventing a rotation of the rotating shaft in a second direction which is opposite from the first direction at an angle of rotation where the projection means has rotated through the given angle beyond the position of the plunger;

wherein said plunger member, said output shaft, said rotatable member and said rotary shaft have axes in parallel relationships thereto; and wherein the rotational speed of the rotatable member through said small angle $\alpha$ is approximately equal to the rotational speed of the rotatable member prior to the projection means abutting the plunger.

6. An apparatus according to claim 5 in which representing the given small angle by $\alpha$, an angle, subtended with respect to the center of rotation of the projection means, by a first point on the projection means where it abuts against the plunger member which then assumes the second position as a result of the rotation in the first direction and a second point on the projection means where it abuts against the plunger member which then assumes the second position as a result of the rotation in the second direction by $\beta$, and an angle which is subtended with respect to to the center of the projection means by a pair of points on the plunger member which correspond to the first and the second point by $\gamma$, $\alpha$ is chosen substantially equal to $(\beta+\gamma/2)$.

7. An apparatus according to claim 6 in which the reduction gearing comprises a pinion fixedly mounted on the rotary shaft of the d.c. motor and a sector gear fixedly mounted on the output shaft means and meshing with the pinion, and wherein the support member comprises a first plate member located above the pinion and the sector gear and supporting the d.c. motor and the solenoid assembly thereon, the first plate member also rotatably carrying the output shaft means and having an opening through which the plunger member extends, a second plate member located below the pinion and the sector gear and also rotatably carrying the output shaft means, and a spacer for integrally connecting the first and the second plate member together with a given spacing therebetween, and in which the lost motion coupling means comprises a substantially rectangular portion which is machined on part of the output shaft means, and a plurality of openings, each conforming to the configuration of the substantially rectangular portion and rotationally displaced from each other, there being one of the openings which is displaced in the first direction of rotation with respect to a center opening and another displaced in the second direction of rotation with respect to the center opening.

8. An apparatus according to claim 7 in which the first and the second stop member comprise raised pieces from the second plate member against which the respective sides of the sector gear abut.

9. An apparatus according to claim 7 in which the sector gear includes a gear portion of an increased diameter which meshes with the pinion, and a gear portion of a reduced diameter which is integral with the gear portion of an increased diameter, the reduction gearing also including a further gear which meshes with the gear portion of the reduced diameter and a second output shaft on which said further gear is fixedly mounted, the first and the second plate member also rotatably carrying the second output shaft.

10. An apparatus for driving rod for rotation comprising:
a support member;
a d.c. motor having a rotary shaft carried by the support member;
a solenoid assembly carried by the support member and including a fixed core member, a plunger member, a spring member for urging the plunger member and an electrical coil which surrounds the fixed core member, the arrangement being such that the plunger member is driven to a first position against the resilience of the spring member when the electrical coil is energized and the plunger member is located at a second position which is spaced from the first position when the electrical coil is deenergized;
output shaft means rotatably mounted in the support member;
reduction gearing means including a gear fixedly mounted on the rotary shaft of the d.c. motor and another gear fixedly mounted on the output shaft means, the reduction gearing being interposed between the rotary shaft of the motor as an input shaft thereof and the output shaft means as an output rotating shaft thereof for providing a speed reduction of rotation of the d.c. motor before it is transmitted to the output shaft means;
a rotatable member rotatably mounted on one of the rotating shafts of the reduction gearing and including projection means which does not abut the plunger member in one of its first and second positions and which abuts against the plunger member in the other of its first and second positions, said rotatable member with projection means being rotatable in a plane perpendicular to the direction of movement of said plunger;
lost motion coupling means for coupling the rotatable member to the rotating shaft in a manner to permit a rotation of the rotatable member relative to said shaft through a given small angle α while preventing a rotation of the rotatable member subsequent to abutment of the projection means with the plunger member and the rotating shaft beyond the given angle;
a first stop member for preventing a rotation of the rotating shaft in first direction at an angle of rotation where the projection means has rotated through the given angle beyond the position of the plunger member, and a second stop member for preventing a rotation of the rotating shaft in a second direction which is opposite from the first direction at an angle of rotation where the projection means has rotated through the given angle beyond the position of the plunger; and
wherein said plunger member, said output shaft, said rotatable member and said rotary shaft have axes in parallel relationships thereto.

11. An apparatus according to claim 10 in which representing the small angle by α, an angle subtended with respect to the center of rotation of the projection means by a first point on the projection means where it abuts against the plunger member in its first position which is assumed as a result of its rotation in the first direction and a second point on the projection means where it abuts against the plunger member at its first position which is assumed as a result of rotation in the second direction by β, and an angle subtended by a pair of points on the plunger member which correspond to the first and the second point with respect to the center of rotation of the projection means by γ, α is substantially equal to $(\beta + \gamma/2)$.

12. An apparatus according to claim 11 in which the reduction gearing comprises a small gear fixedly mounted on the rotary shaft of the d.c. motor and a larger gear fixedly mounted on the output shaft means and meshing with the small gear, the larger gear being formed in its lower surface with an annular groove in which the rotatable member is rotatably mounted, and in which the support member comprises a base located above the small and the larger gear and carrying the d.c. motor and the solenoid assembly thereon and also rotatably carrying the output shaft means and having an opening through which the plunger member extends, the lost motion coupling means comprising a fan-shaped groove formed in the larger gear so as to be continuous with the annular groove, the projection means on the rotatable member engaging the fan-shaped groove which permits the projection means to rotate therein through the given small angle.

13. An apparatus according to claim 12 in which the first and the second stop members comprise upright walls of the base against which the projection means abuts.

14. An apparatus according to claim 13 in which the projection means carries an elastic member on its surface.

15. An apparatus according to claim 13 in which the output shaft means comprises a hollow rotary shaft on which the larger gear is fixedly mounted, an output shaft which is fitted inside the hollow rotary shaft and a spring pin for connecting the output shaft to the hollow rotary shaft.

16. An apparatus according to claim 11 in which the reduction gearing comprises a pinion fixedly mounted on the rotary shaft of the d.c. motor and a sector gear fixedly mounted on the output shaft means and meshing with the pinion, and wherein the support member comprises a first plate member located above the pinion and the sector gear and supporting the d.c. motor and the solenoid assembly thereon, the first plate member also rotatably carrying the output shaft means and having an opening through which the plunger member extends, a second plate member located below the pinion and the sector gear and also rotatably carrying the output shaft means, and a spacer for integrally connecting the first and the second plate member together with a given spacing therebetween and in which the lost motion coupling means comprises a substantially rectangular portion which is machined on part of the output shaft means, and a plurality of openings, each conforming to the configuration of the substantially rectangular portion and rotationally displaced from each other, there being one of the openings which is displaced in the first direction of rotation with respect to a center opening and another displaced in the second direction of rotation with respect to the center opening.

17. An apparatus according to claim 16 in which the first and the second stop members comprise raised pieces from the second plate member against which the respective sides of the sector gear abut.

18. An apparatus according to claim 16 in which the sector gear includes a gear portion of an increased diameter which meshes with the pinion, and a gear portion of a reduced diameter which is integral with the gear portion of an increased diameter, the reduction gearing also including a further gear which meshes with the gear portion of the reduced diameter and a second output shaft on which said further gear is fixedly mounted, the first and the second plate member also rotatably carrying the second output shaft.

* * * * *